(12) United States Patent
Faccin

(10) Patent No.: US 8,185,107 B2
(45) Date of Patent: May 22, 2012

(54) IP ADDRESS ALLOCATION IN EVOLVED WIRELESS NETWORKS

(75) Inventor: Stefano Faccin, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1091 days.

(21) Appl. No.: 12/056,836

(22) Filed: Mar. 27, 2008

(65) Prior Publication Data

US 2008/0240040 A1 Oct. 2, 2008

Related U.S. Application Data

(60) Provisional application No. 60/908,823, filed on Mar. 29, 2007.

(51) Int. Cl.
*H04W 4/00* (2009.01)
(52) U.S. Cl. .................. 455/435.1; 455/432.1; 455/436; 370/331
(58) Field of Classification Search ............... 455/435.1, 455/432.1, 436; 370/331
See application file for complete search history.

(56) References Cited

U.S. PATENT DOCUMENTS

| | | | |
|---|---|---|---|
| 2005/0117591 A1* | 6/2005 | Hurtta et al. .................. 370/401 |
| 2005/0125314 A1 | 6/2005 | Agarwal et al. |
| 2005/0129032 A1 | 6/2005 | Kim et al. |
| 2006/0018291 A1 | 1/2006 | Patel et al. |
| 2007/0008906 A1 | 1/2007 | Han et al. |
| 2007/0214283 A1 | 9/2007 | Metke et al. |
| 2008/0181178 A1* | 7/2008 | Shaheen ....................... 370/331 |

FOREIGN PATENT DOCUMENTS

| | | |
|---|---|---|
| EP | GB 2 348 569 A | 10/2000 |
| EP | 1 569 412 A1 | 8/2005 |
| WO | WO 97/48246 | 12/1997 |
| WO | WO 00/36794 | 6/2000 |

OTHER PUBLICATIONS

Notification of Transmittal of The International Search Report and The Written Opinion of The International Searching Authority, or The Declaration dated Jul. 17, 2008 in reference to PCT/US2008/004141 (12 pgs).
U.S. Appl. No. 12/009,725, filed Jan. 22, 2008; "Support of Hierarchical Network Mobility for Proxy Mobile IP"; Stefano Faccin; 57 pages.
Mobility Management using Proxy Mobile 1Pv4; draft-leung-mip4-proxy-mode-02.txt; Leung, et al.; Jan. 10, 2007; 15 pages.
Proxy Mobile 1Pv6; draft-sgundave-mip6-proxymip6-01; Gundavelli, et al.; Jan. 5, 2007; 37 pages.
WiMax Forum/3GPP2 Proxy Mobile 1Pv4; draft-leung-mip4-proxy-mode.4.txt; Leung, et al.; Sep. 20, 2007; 38 pages.

* cited by examiner

*Primary Examiner* — Justin Lee

(57) ABSTRACT

A networking system includes a first wireless network module that transmits a request to attach to a network and a second wireless network module. The second wireless network module receives the request, determines whether the first wireless network module requires an IP address based on the request, and selectively allocates an IP address to the first wireless network module based on the determination.

20 Claims, 13 Drawing Sheets

IP ADDRESS ALLOCATION IN EVOLVED WIRELESS NETWORKS

CROSS-REFERENCE TO RELATED APPLICATIONS

This application claims the benefit of U.S. Provisional Application No. 60/908,823, filed on Mar. 29, 2007, which is incorporated herein by reference in its entirety.

FIELD

The present disclosure relates to IP address allocation in evolved wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a wireless network (such as, for example, a $3^{rd}$ Generation Partnership Project (3GPP) evolved wireless network, a wireless terminal may request to attach to the wireless network via an attach procedure. The wireless terminal may include user equipment (UE) in the 3GPP wireless network. For example, the wireless terminal may include a mobile phone, and the wireless network may be the cellular network of a mobile phone operator. Conversely, the wireless terminal may include a laptop computer or other mobile computing device, and the wireless network may be a local area network (LAN) or Internet service provider (ISP). The wireless network allocates an IP address to the wireless terminal during the attach procedure.

Referring now to FIGS. 1-3, exemplary wireless networks that may implement the attach procedure are shown. As shown in FIG. 1, a home network 102 receives packets from and sends packets to a distributed communications system 104 such as the Internet. A wireless terminal 106 wirelessly connects to the home network 102. As shown in FIG. 2, the home network 102 is connected to one or more visited networks 110. For example only, FIG. 2 depicts three visited networks 110-1, 110-2 and 110-3. In various implementations, the visited networks 110 may be the networks of other service providers, including service providers in other countries. A mobile wireless terminal 120 includes mobility features that allow the mobile wireless terminal 120 to communicate with the visited networks 110.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, that have not been updated to include mobility functionality.

As described above with respect to FIGS. 1-3, the wireless terminal may attempt to establish a link with one of the home network 102, a visited network 110, and/or a visited network with mobility 160 via an attach procedure. Attachment to visited networks and visited networks with mobility are described in more detail in U.S. patent application Ser. No. 12/009,725, filed Jan. 22, 2008, which is incorporated herein by reference.

Referring now to FIG. 4, a timeline of steps performed when the wireless terminal 106 connects to the network 102 (i.e. an attach procedure) is shown. The attach procedure 200 includes interaction between the wireless terminal 106 and one or more nodes of the network 102, including, but not limited to, a mobility management entity (MME) 202, a serving SAE (system architecture evolution) gateway 204, a packet data network (PDN) SAE gateway 206, a policy and charging rules function (PCRF) 208, and a home subscriber server (HSS) 210. For example only, the wireless terminal 106 may include a UE device and an enhanced or evolved node B (eNB) wireless base station.

The wireless terminal 106 performs authentication and identification with the network 102. This may include communicating with an Access, Authentication, and Accounting (AAA) server. During authentication and identification, the wireless terminal 106 transmits an attach request to the MME 202. The MME 202 requests an identity of the wireless terminal 106 and authenticates the identity with the HSS 210. Upon authentication, the PDN SAE gateway 206 allocates an Internet protocol (IP) address to the wireless terminal 106 and accepts the attach request. The wireless terminal 106 completes the attach. The attach procedure 200 may include other network-side steps unrelated to IP address allocation, such as clearing previous bearer context requests and updating locations.

SUMMARY

A networking system comprises a first wireless network module that transmits a request to attach to a network and a second wireless network module. The second wireless network module receives the request, determines whether the first wireless network module requires an IP address based on the request, and selectively allocates an IP address to the first wireless network module based on the determination.

In other features, the request includes an indication that the first wireless network module requires an IP address. The second wireless network module allocates an IP address to the first wireless network module based on the request. The request includes an indication that the wireless network module does not require an IP address. The second wireless network module does not allocate an IP address to the first wireless network module. The first wireless network module attaches to the network without receiving an IP address. After attaching to the network, the first wireless network module obtains an IP address from a third wireless network module. The first wireless network module modifies a bearer context based on the IP address obtained from the third wireless network module.

In other features, the second wireless network module retrieves subscriber data associated with the first wireless network module based on the request. A database stores the subscriber data. The second wireless network module determines whether to allocate an IP address to the first wireless network module based on the subscriber data. The subscriber data indicates whether the first wireless network module is one of an integrated wireless terminal and a non-integrated wireless terminal. The subscriber data indicates whether the first wireless network module requires IP address allocation during an attach procedure.

In other features, the network comprises a $3^{rd}$ Generation Partnership Project (3GPP) evolved wireless network. The first wireless network module comprises at least one of a mobile telephone and a laptop computer. The second wireless network module comprises at least one of a mobility management entity (MME), a gateway, and a home subscriber server (HSS) in a 3$^{rd}$ Generation Partnership Project (3GPP) evolved wireless network. The second wireless network module creates a bearer context request that indicates whether the first wireless network module requires IP address allocation.

A networking method comprises transmitting a request to attach to a network from a first wireless network module, receiving the request at a second wireless network module, determining whether the first wireless network module requires an IP address based on the request, and selectively allocating an IP address to the first wireless network module based on the determination.

In other features, the request includes an indication that the wireless network module requires an IP address. The method further comprises allocating an IP address to the first wireless network module based on the request. The request includes an indication that the wireless network module does not require an IP address. The first wireless network module is not allocated an IP address. The first wireless network module attaches to the network without receiving an IP address. After attaching to the network, the first wireless network module obtains an IP address from a third wireless network module. The method further comprises modifying a bearer context based on the IP address obtained from the third wireless network module.

In other features, the method further comprises retrieving subscriber data associated with the first wireless network module based on the request. The method further comprises storing the subscriber data in a database. The method further comprises determining whether to allocate an IP address to the first wireless network module based on the subscriber data. The subscriber data indicates whether the first wireless network module is one of an integrated wireless terminal and a non-integrated wireless terminal. The subscriber data indicates whether the first wireless network module requires IP address allocation during an attach procedure.

In other features, the network comprises a 3$^{rd}$ Generation Partnership Project (3GPP) evolved wireless network. The first wireless network module comprises at least one of a mobile telephone and a laptop computer. The second wireless network module comprises at least one of a mobility management entity (MME), a gateway, and a home subscriber server (HSS) in a 3$^{rd}$ Generation Partnership Project (3GPP) evolved wireless network. The method further comprises creating a bearer context request that indicates whether the first wireless network module requires IP address allocation.

A networking system comprises first wireless network means for transmitting a request to attach to a network and second wireless network means for receiving the request, for determining whether the first wireless network means requires an IP address based on the request, and for selectively allocates an IP address to the first wireless network means based on the determination.

In other features, the request includes an indication that the first wireless network means requires an IP address. The second wireless network means allocates an IP address to the first wireless network means based on the request. The request includes an indication that the first wireless network means does not require an IP address. The second wireless network means does not allocate an IP address to the first wireless network means. The first wireless network means attaches to the network without receiving an IP address. After attaching to the network, the first wireless network means obtains an IP address from third wireless network means for allocating an IP address. The first wireless network means modifies a bearer context based on the IP address obtained from the third wireless network means.

In other features, the second wireless network means retrieves subscriber data associated with the first wireless network means based on the request. A database stores the subscriber data. The second wireless network means determines whether to allocate an IP address to the first wireless network means based on the subscriber data. The subscriber data indicates whether the first wireless network means is one of an integrated wireless terminal and a non-integrated wireless terminal. The subscriber data indicates whether the first wireless network means requires IP address allocation during an attach procedure.

In other features, the network comprises a 3$^{rd}$ Generation Partnership Project (3GPP) evolved wireless network. The first wireless network means comprises at least one of a mobile telephone and a laptop computer. The second wireless network means comprises at least one of a mobility management entity (MME), a gateway, and a home subscriber server (HSS) in a 3$^{rd}$ Generation Partnership Project (3GPP) evolved wireless network. The second wireless network means creates a bearer context request that indicates whether the first wireless network means requires IP address allocation.

A computer program stored on a computer-readable medium for use by a processor for operating a network comprises transmitting a request to attach to a network from a first wireless network module, receiving the request at a second wireless network module, determining whether the first wireless network module requires an IP address based on the request, and selectively allocating an IP address to the first wireless network module based on the determination.

In other features, the request includes an indication that the wireless network module requires an IP address. The computer program further comprises allocating an IP address to the first wireless network module based on the request. The request includes an indication that the wireless network module does not require an IP address. The first wireless network module is not allocated an IP address. The first wireless network module attaches to the network without receiving an IP address. After attaching to the network, the first wireless network module obtains an IP address from a third wireless network module. The computer program further comprises modifying a bearer context based on the IP address obtained from the third wireless network module.

In other features, the computer program further comprises retrieving subscriber data associated with the first wireless network module based on the request. The computer program further comprises storing the subscriber data in a database. The computer program further comprises determining whether to allocate an IP address to the first wireless network module based on the subscriber data. The subscriber data indicates whether the first wireless network module is one of an integrated wireless terminal and a non-integrated wireless terminal. The subscriber data indicates whether the first wireless network module requires IP address allocation during an attach procedure.

In other features, the network comprises a 3$^{rd}$ Generation Partnership Project (3GPP) evolved wireless network. The first wireless network module comprises at least one of a mobile telephone and a laptop computer. The second wireless network module comprises at least one of a mobility management entity (MME), a gateway, and a home subscriber server (HSS) in a 3$^{rd}$ Generation Partnership Project (3GPP) evolved wireless network. The computer program further comprises creating a bearer context request that indicates whether the first wireless network module requires IP address allocation.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
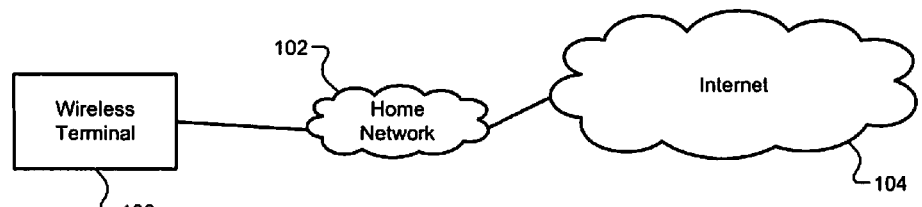
FIG. 1 is a functional block diagram of a wireless communications system according to the prior art.
Figure 2:
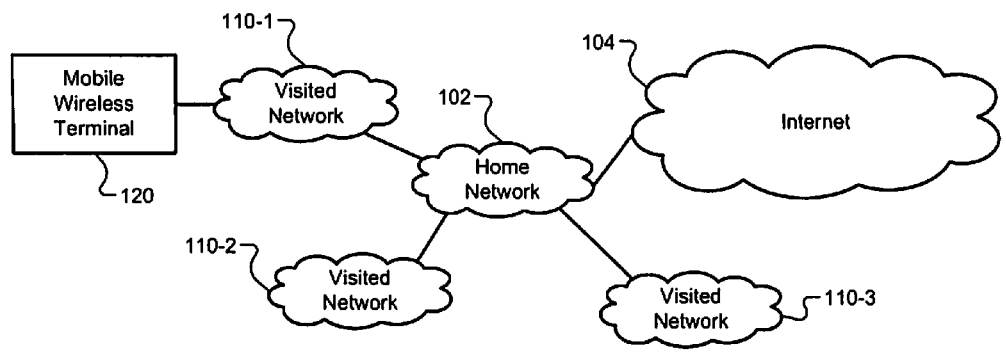
FIG. 2 is a functional block diagram of a wireless communications system offering mobility according to the prior art.
Figure 3:
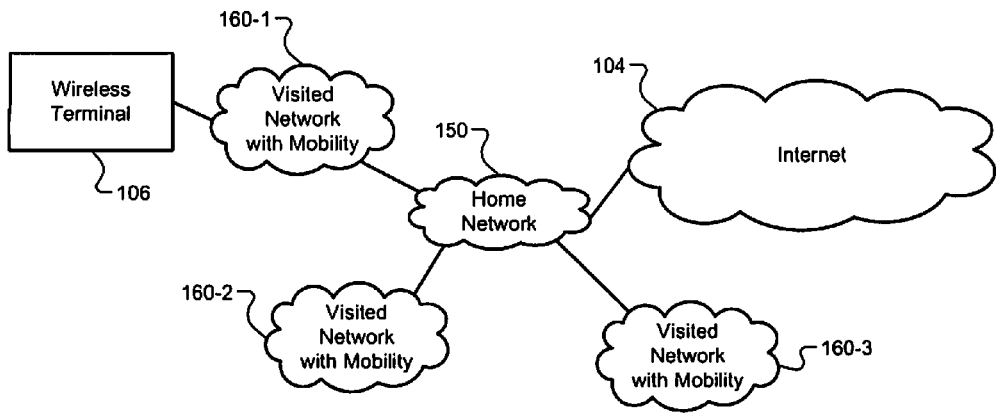
FIG. 3 is a functional block diagram of a wireless communications system that provides proxy mobility to a wireless terminal according to the prior art.
Figure 4:
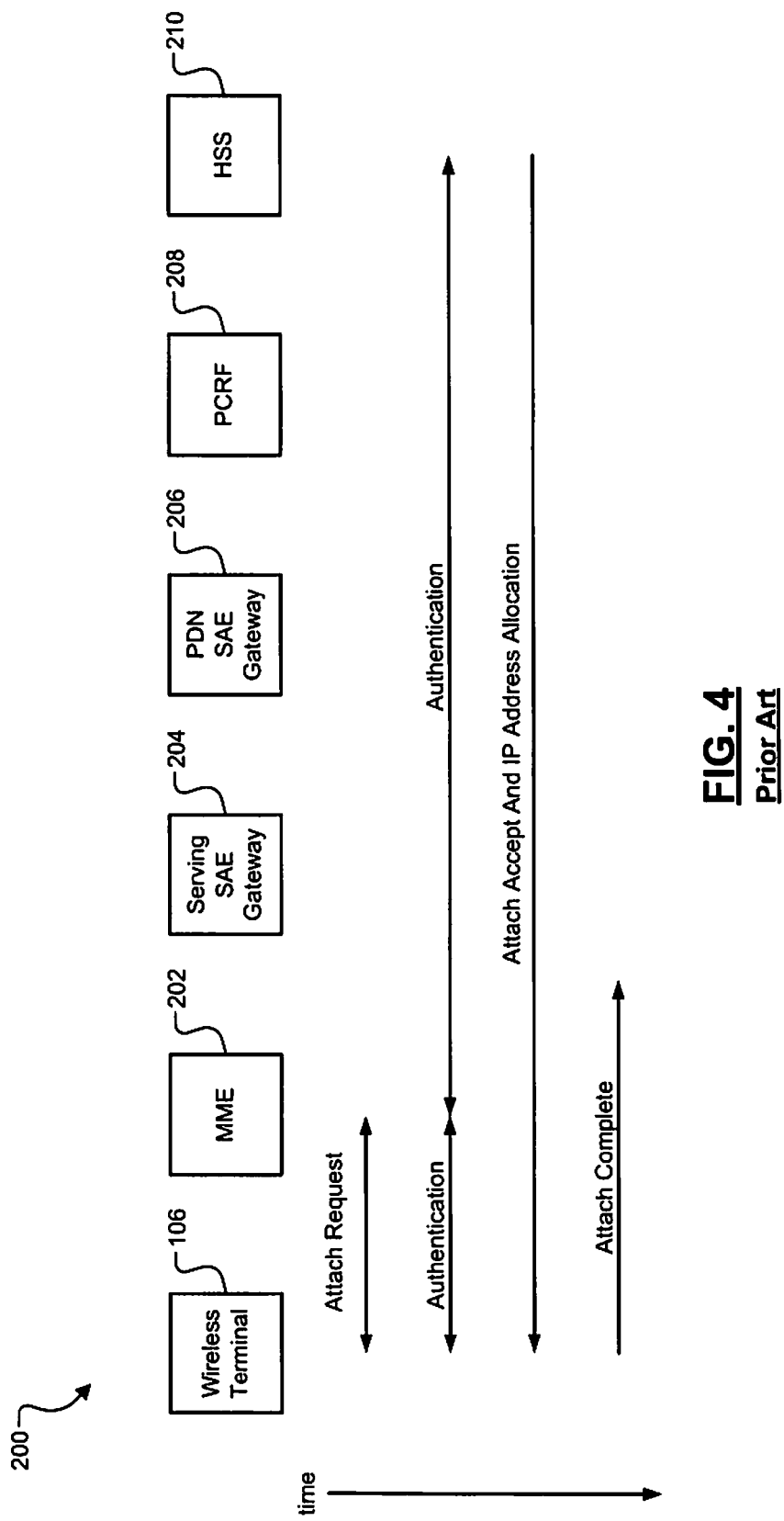
FIG. 4 illustrates a wireless terminal attach procedure according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. Steps within a method may be executed in different order or concurrently without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A wireless terminal is automatically allocated an IP address during an attach procedure in, for example, a 3GPP evolved wireless network regardless of terminal type. For example, wireless terminals that attach to the wireless network may include integrated and non-integrated terminals. Integrated terminals include, for example, cellular phones, which may require IP address allocation during the attach procedure. Non-integrated terminals include, for example, laptop computers with a wireless module (e.g. a PCMCIA card). Non-integrated terminals may require IP address allocation after the attach procedure is completed via an alternative allocation method such as DHCP (dynamic host configuration protocol).

When a non-integrated wireless terminal attaches to the wireless network, the wireless module automatically receives an IP address via the attach procedure. For example, the wireless network typically does not differentiate between wireless terminal types during the attach procedure and automatically allocates the IP address in response to the attach request. An operating system of the non-integrated wireless terminal may not be aware of the assigned IP address and may acquire a second IP address via an alternative method. Consequently, the non-integrated wireless terminal receives two IP addresses.

During an attach procedure in one implementation, the wireless network selectively allocates an IP address to the wireless terminal based on wireless terminal type. In such an implementation, instead of automatically allocating an IP address to the wireless terminal, the wireless network determines whether the wireless terminal requires an IP address during the attach procedure and selectively allocates an IP address accordingly. Consequently, allocating multiple IP addresses to the same wireless terminal is avoided.

Figure 5:
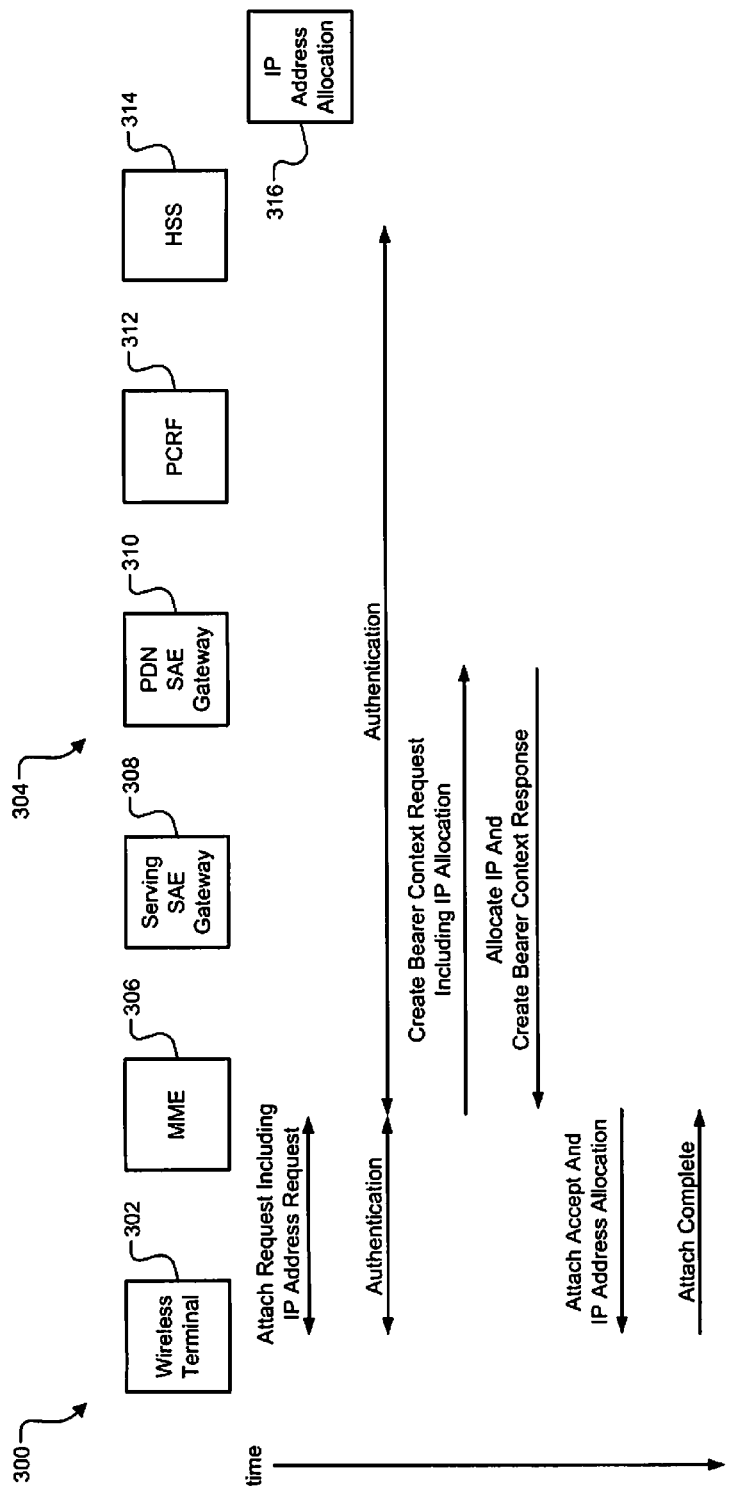
FIG. 5 illustrates a wireless terminal attach procedure wherein the wireless terminal requires IP address allocation.

Referring now to FIG. 5, an attach procedure 300 in accordance with one implementation is shown. A wireless network module such as wireless terminal 302 attempts to attach to a network 304 that includes various network modules such as an MME 306, a serving SAE gateway 308, a PDN SAE gateway 310, a PCRF 312, and an HSS 314. The network 304 may include an external IP address allocation node 316. The wireless terminal 302 transmits an attach request (i.e. a data packet that includes the attach request) to the MME 306. In one implementation, the attach request includes an indication of whether the wireless terminal 302 requires an IP address to be allocated during the attach procedure 300. As shown, the wireless terminal 302 includes a request for IP address allocation in the attach request. For example, the attach request may include a data packet, and the data packet may include a field associated with the request IP address allocation. In this implementation, as shown, the wireless terminal 302 may include an integrated terminal that requires IP address allocation during the attach procedure 300.

Upon authentication, an IP address is allocated to the wireless terminal 302. For example, the MME 306 may transmit a create bearer context request (e.g. a data packet that includes the create bearer context request) to the PDN SAE gateway 310 that indicates that the wireless terminal 302 requires an IP address. In response, the PDN SAE gateway 310 allocates an IP address to the wireless terminal 302 and transmits a create bearer context response (e.g. a data packet that includes the create bearer context response) to the MME 306. The MME 306 transmits an attach accept (e.g. a data packet that includes the attach accept), including the allocated IP address, to the wireless terminal 302. The wireless terminal 302 completes the attach. Because the wireless terminal 302 requested and received an IP address during the attach procedure 300, the wireless terminal 302 does not request an IP address using other methods after the attach procedure 300. For example, the wireless terminal 302 does not require an IP address from the external IP address allocation node 316.

Figure 6:
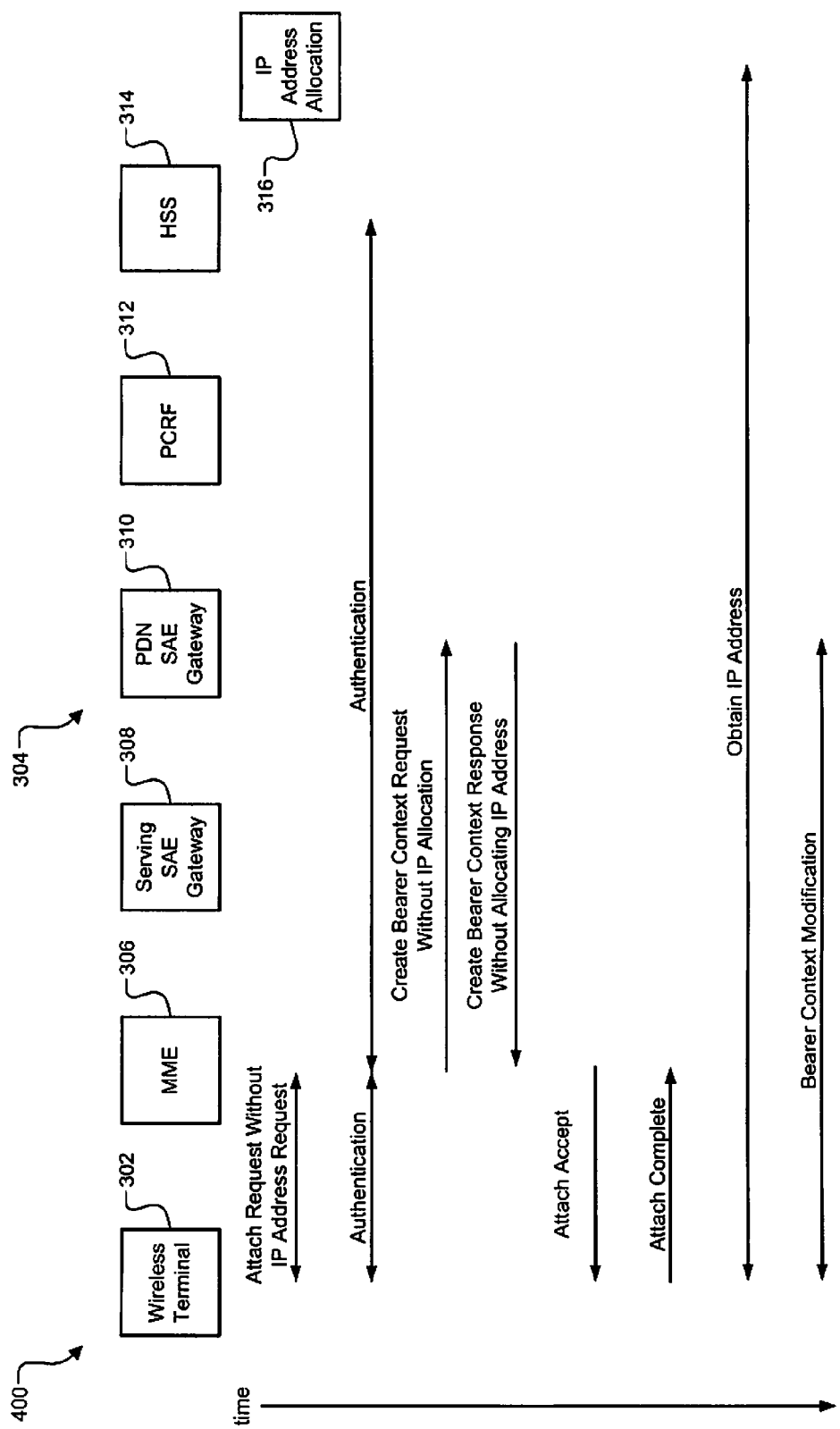
FIG. 6 illustrates a wireless terminal attach procedure wherein the wireless terminal does not require IP address allocation.

Referring now to FIG. 6, an attach procedure 400 is shown in which the wireless terminal 302 includes a non-integrated terminal that does not require IP address allocation. The wireless terminal 302 transmits an attach request to the MME 306. In one implementation, the attach request includes an indication of whether the wireless terminal 302 requires an IP address to be allocated during the attach procedure 400. As shown, the wireless terminal 302 indicates, in the attach request, that IP address allocation is not required.

Upon authentication, the network 304 does not allocate an IP address to the wireless terminal 302. For example, the MME 306 may transmit a create bearer context request to the PDN SAE gateway 310 that indicates that the wireless terminal 302 does not require an IP address. In response, the PDN SAE gateway 310 transmits a create bearer context response to the MME 306 that indicates that an IP address was not allocated to the wireless terminal 302. The MME 306 transmits an attach accept to the wireless terminal 302. The attach accept may include any additional information required for the wireless terminal 302 to obtain an IP address after the attach procedure 400. The wireless terminal 302 completes the attach.

After the attach procedure, the wireless terminal 302 independently obtains an IP address. For example, the wireless terminal 302 may communicate with the external IP address allocation node 316 to obtain an IP address.

As described in FIG. 5, the network 304 allocates the IP address to the wireless terminal 302. Consequently, the network 304 knows the IP address of the wireless terminal 302. Conversely, the wireless terminal 302 obtains an IP address via the external IP address allocation node 316 and, as such, the network 304 does not know the IP address of the wireless terminal 302. As shown in FIG. 6, the wireless terminal 302 may initiate a bearer context modification step with the PDN SAE gateway 310 to inform the network of the IP address of the wireless terminal 302.

Figure 7:
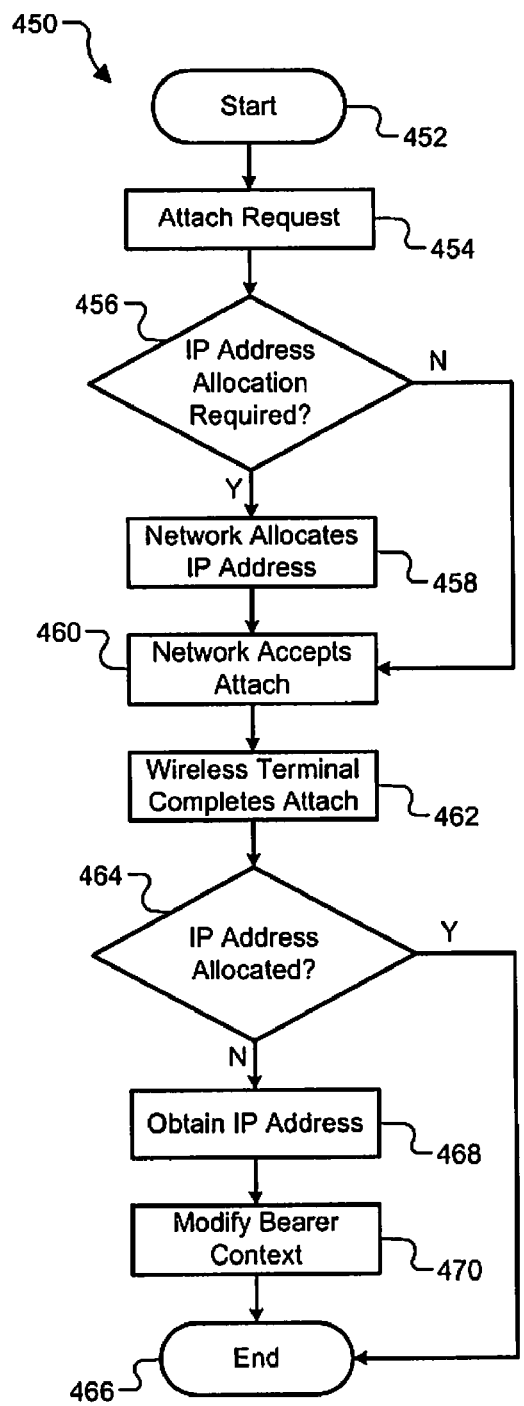
FIG. 7 is a flow diagram illustrating steps of an attach procedure.

Referring now to FIG. 7, a method 450 for attaching to a network 304 begins in step 452. In step 454, the wireless terminal 302 transmits an attach request that includes an IP allocation preference to the network 304. In step 456, the network 304 determines whether the wireless terminal 302 requires IP allocation during the attach. If true, the method 450 continues to step 458. If false, the method 450 continues to step 460.

In step 458, the network 304 allocates an IP address to the wireless terminal 302. In step 460, the network 304 accepts the attach. In step 462, the wireless terminal 302 completes the attach. In step 464, the wireless terminal 302 determines whether the network 304 allocated an IP address during the attach. If true, the method 450 continues to step 466. If false, the method 450 continues to step 468. In step 468, the wireless terminal 302 obtains an IP address via an alternative method, such as obtaining an IP address from the external IP address allocation node 316. In step 470, the wireless terminal 302 modifies the bearer context with the obtained IP address. The method ends in step 466.

Figure 8:
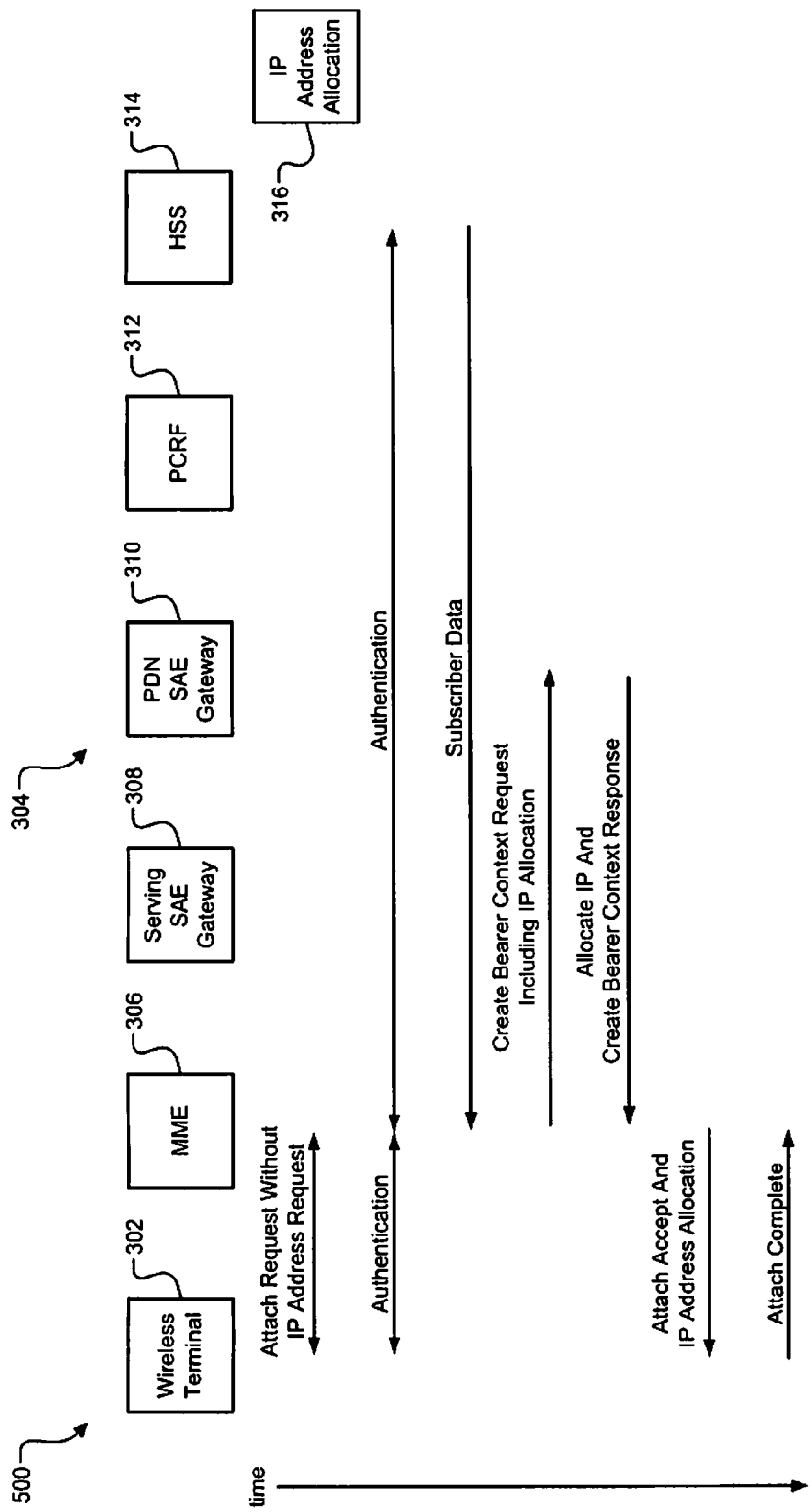
FIG. 8 illustrates a wireless terminal attach procedure wherein a network allocates an IP address based on subscriber data.

Referring now to FIG. 8, the wireless terminal 302 does not indicate whether IP address allocation is required during an attach procedure 500. Instead, the network 304 may store data (e.g. subscriber data stored in a subscriber database) that indicates attributes of the wireless terminal 302. For example, subscriber data may include, but is not limited to, a terminal type of the wireless terminal 302 and an indication of whether the wireless terminal 302 requires IP address allocation. For example only, the HSS 314 may include the subscriber database.

The wireless terminal 302 transmits an attach request to the MME 306. The attach request may not include an indication of whether the wireless terminal 302 requires an IP address to be allocated during the attach procedure 500. As shown, the wireless terminal 302 does not include a request for IP address allocation in the attach request.

Upon authentication, the network 304 (e.g. via the HSS 314) retrieves the subscriber data associated with the wireless terminal 302 from the subscriber data base and transmits the subscriber data to the MME 306. As shown, the subscriber data for the wireless terminal 302 indicates that the wireless terminal 302 requires IP address allocation during the attach procedure 500. In response, the MME 306 may transmit a create bearer context request to the PDN SAE gateway 310 that indicates that the wireless terminal 302 requires an IP address based on the subscriber data. The PDN SAE gateway 310 allocates an IP address to the wireless terminal 302 and transmits a create bearer context response to the MME 306. The MME 306 transmits an attach accept, including the allocated IP address, to the wireless terminal 302. The wireless terminal 302 completes the attach. Because the wireless terminal 302 requested and received an IP address during the attach procedure 500, the wireless terminal 302 does not request an IP address using other methods after the attach procedure 500.

Figure 9:
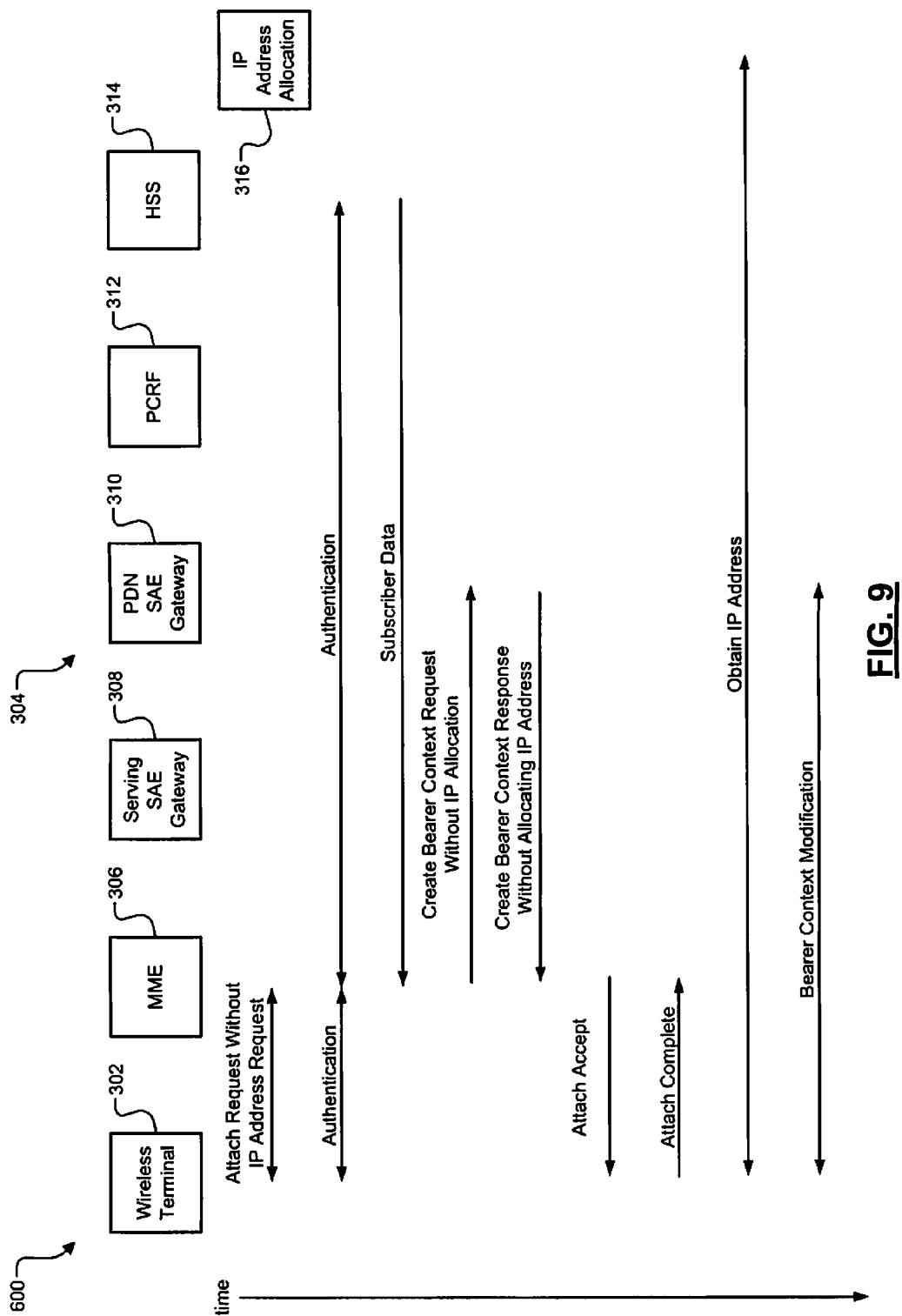
FIG. 9 illustrates a wireless terminal attach procedure wherein a network does not allocate an IP address based on subscriber data.

Referring now to FIG. 9, the wireless terminal 302 does not indicate whether IP address allocation is required during an attach procedure 600. The wireless terminal 302 transmits an attach request to the MME 306. The attach request may not include an indication of whether the wireless terminal 302 requires an IP address to be allocated during the attach procedure 600. As shown, the wireless terminal 302 does not include a request for IP address allocation in the attach request.

Upon authentication, the network 304 (e.g. via the HSS 314) retrieves the subscriber data associated with the wireless terminal 302 from the subscriber data base and transmits the subscriber data to the MME 306. As shown, the subscriber data for the wireless terminal 302 indicates that the wireless terminal 302 does not require IP address allocation during the attach procedure 600. In response, the MME 306 may transmit a create bearer context request to the PDN SAE gateway 310 that indicates that the wireless terminal 302 does not require an IP address based on the subscriber data. The PDN SAE gateway 310 transmits a create bearer context response to the MME 306 that indicates that an IP address was not allocated to the wireless terminal 302. The MME 306 transmits an attach accept to the wireless terminal 302. The attach accept may include any additional information required for the wireless terminal 302 to obtain an IP address after the attach procedure 600. The wireless terminal 302 completes the attach.

After the attach procedure, the wireless terminal 302 independently obtains an IP address. For example, the wireless terminal 302 may communicate with the external IP address allocation node 316 to obtain an IP address. The wireless terminal 302 may initiate a bearer context modification step with the PDN SAE gateway 310 to inform the network of the IP address of the wireless terminal 302.

Figure 10:
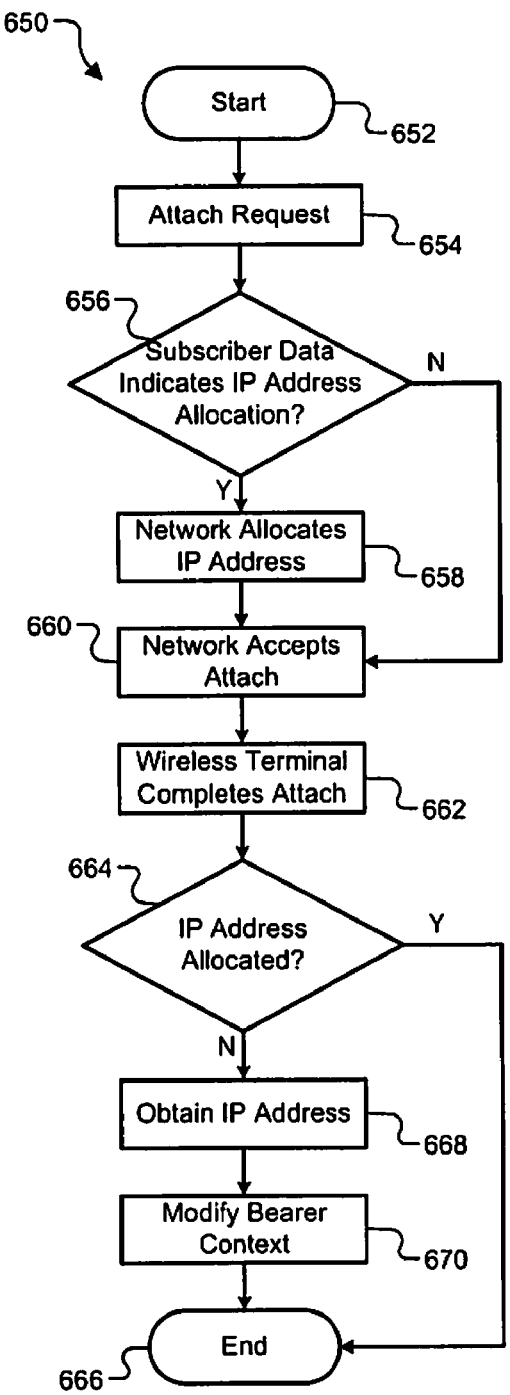
FIG. 10 is a flow diagram illustrating steps of an attach procedure based on subscriber data.

Referring now to FIG. 10, a method 650 for attaching to a network 304 begins in step 652. In step 654, the wireless terminal 302 transmits an attach request that does not include an IP allocation preference to the network 304. In step 656, the network 304 determines whether the wireless terminal 302 requires IP allocation during the attach based on subscriber data. If true, the method 650 continues to step 658. If false, the method 650 continues to step 660.

In step 658, the network 304 allocates an IP address to the wireless terminal 302. In step 660, the network 304 accepts the attach. In step 662, the wireless terminal 302 completes the attach. In step 664, the wireless terminal 302 determines whether the network 304 allocated an IP address during the attach. If true, the method 650 continues to step 666. If false, the method 650 continues to step 668. In step 668, the wireless terminal 302 obtains an IP address via an alternative method, such as obtaining an IP address from the external IP address allocation node 316. In step 670, the wireless terminal 302 modifies the bearer context with the obtained IP address. The method ends in step 666.

Referring now to FIGS. 11A-11G, various exemplary implementations incorporating the teachings of the present disclosure are shown.

Figure 11A:
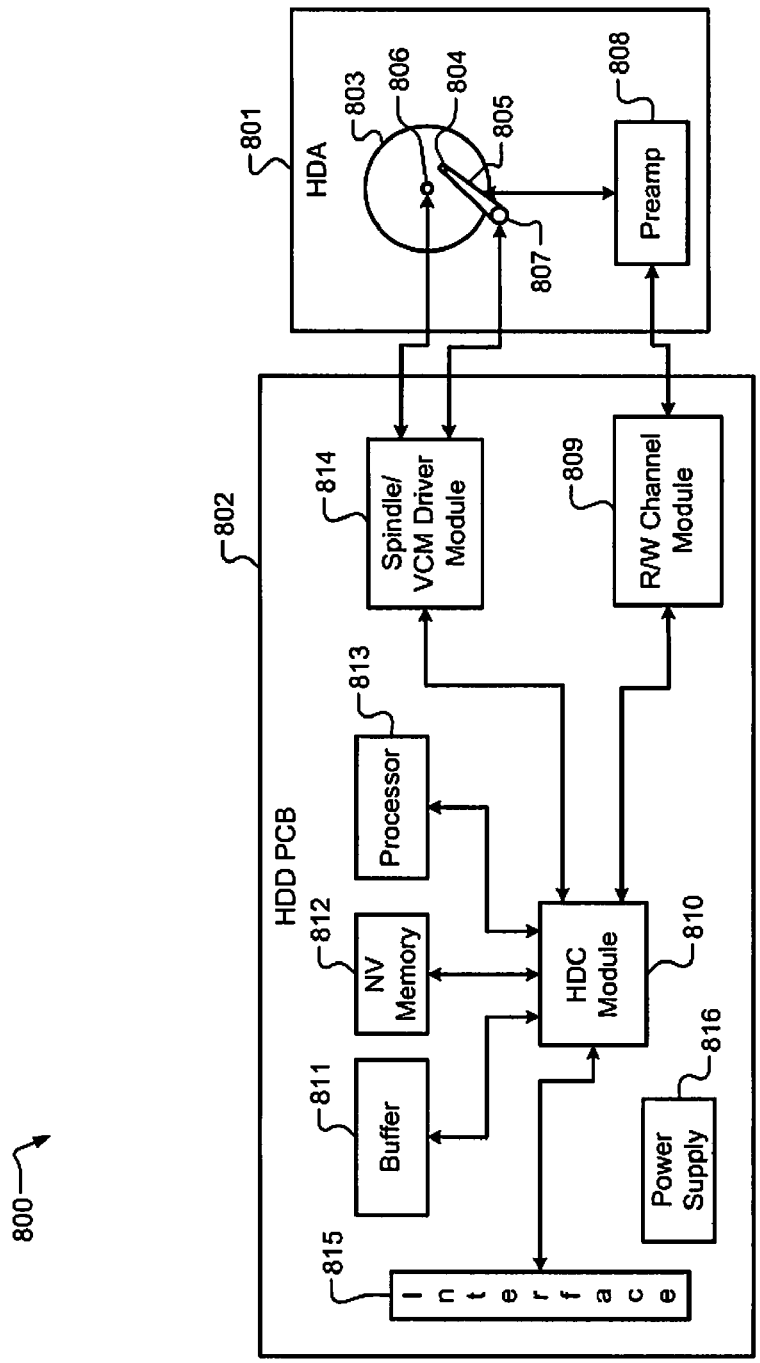
FIG. 11A is a functional block diagram of a hard disk drive.

Referring now to FIG. 11A, the teachings of the disclosure can be implemented in an I/O interface 815 of a hard disk drive (HDD) 800. The HDD 800 includes a hard disk assembly (HDA) 801 and an HDD printed circuit board (PCB) 802. The HDA 801 may include a magnetic medium 803, such as one or more platters that store data, and a read/write device 804. The read/write device 804 may be arranged on an actuator arm 805 and may read and write data on the magnetic medium 803. Additionally, the HDA 801 includes a spindle motor 806 that rotates the magnetic medium 803 and a voice-coil motor (VCM) 807 that actuates the actuator arm 805. A preamplifier device 808 amplifies signals generated by the read/write device 804 during read operations and provides signals to the read/write device 804 during write operations.

The HDD PCB 802 includes a read/write channel module (hereinafter, "read channel") 809, a hard disk controller (HDC) module 810, a buffer 811, nonvolatile memory 812, a processor 813, and a spindle/VCM driver module 814. The read channel 809 processes data received from and transmitted to the preamplifier device 808. The HDC module 810 controls components of the HDA 801 and communicates with an external device (not shown) via the I/O interface 815. The external device may include a computer, a multimedia device, a mobile computing device, etc. The I/O interface 815 may include wireline and/or wireless communication links.

The HDC module 810 may receive data from the HDA 801, the read channel 809, the buffer 811, nonvolatile memory 812, the processor 813, the spindle/VCM driver module 814, and/or the I/O interface 815. The processor 813 may process the data, including encoding, decoding, filtering, and/or formatting. The processed data may be output to the HDA 801, the read channel 809, the buffer 811, nonvolatile memory 812, the processor 813, the spindle/VCM driver module 814, and/or the I/O interface 815.

The HDC module 810 may use the buffer 811 and/or nonvolatile memory 812 to store data related to the control and operation of the HDD 800. The buffer 811 may include DRAM, SDRAM, etc. Nonvolatile memory 812 may include any suitable type of semiconductor or solid-state memory, such as flash memory (including NAND and NOR flash memory), phase change memory, magnetic RAM, and multi-state memory, in which each memory cell has more than two states. The spindle/VCM driver module 814 controls the spindle motor 806 and the VCM 807. The HDD PCB 802 includes a power supply 816 that provides power to the components of the HDD 800.

Figure 11B:
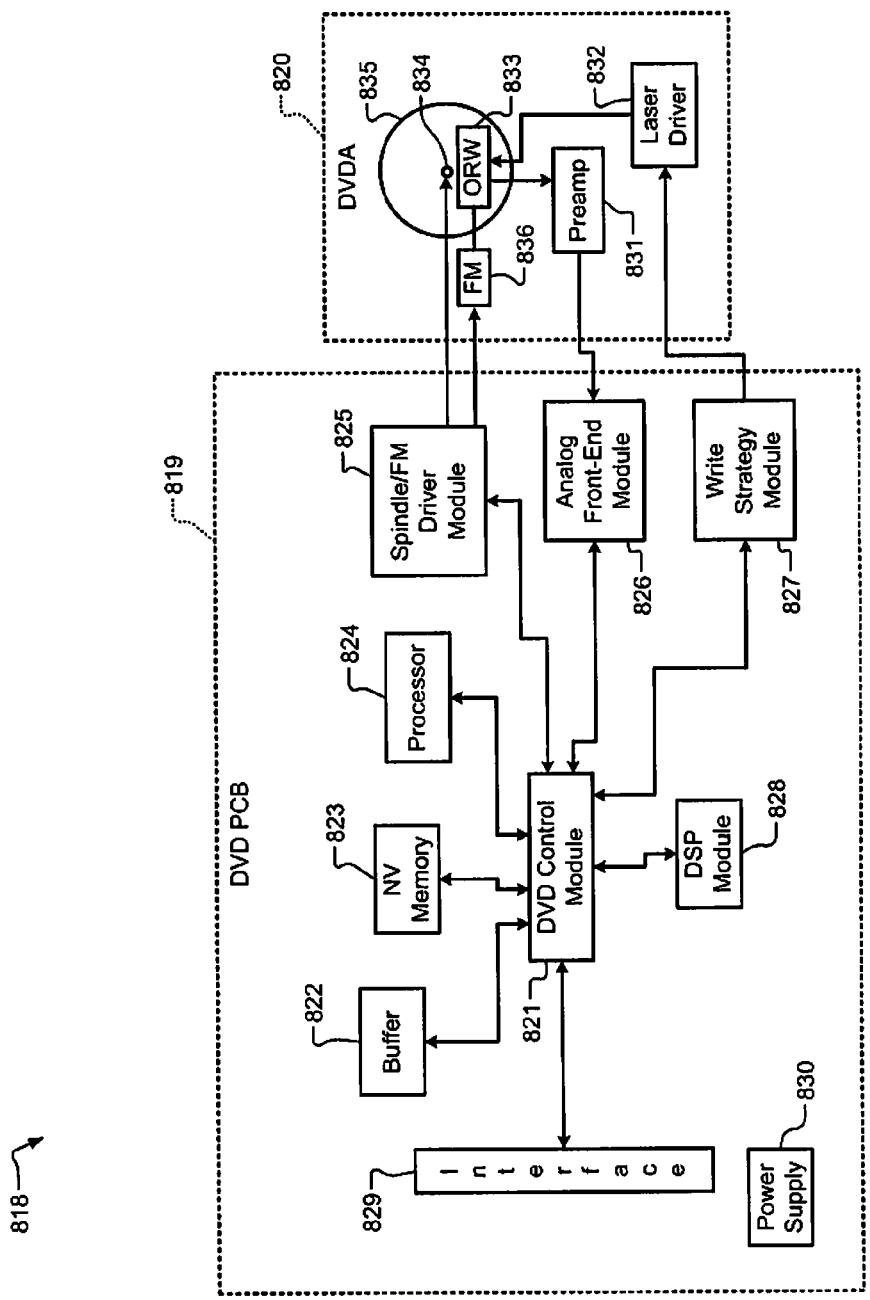
FIG. 11B is a functional block diagram of a digital versatile disc (DVD) drive.

Referring now to FIG. 11B, the teachings of the disclosure can be implemented in an I/O interface 829 of a DVD drive 818 or of a CD drive (not shown). The DVD drive 818 includes a DVD PCB 819 and a DVD assembly (DVDA) 820. The DVD PCB 819 includes a DVD control module 821, a buffer 822, nonvolatile memory 823, a processor 824, a spindle/FM (feed motor) driver module 825, an analog front-end module 826, a write strategy module 827, and a DSP module 828.

The DVD control module 821 controls components of the DVDA 820 and communicates with an external device (not shown) via the I/O interface 829. The external device may include a computer, a multimedia device, a mobile computing device, etc. The I/O interface 829 may include wireline and/or wireless communication links.

The DVD control module 821 may receive data from the buffer 822, nonvolatile memory 823, the processor 824, the spindle/FM driver module 825, the analog front-end module 826, the write strategy module 827, the DSP module 828, and/or the I/O interface 829. The processor 824 may process the data, including encoding, decoding, filtering, and/or formatting. The DSP module 828 performs signal processing, such as video and/or audio coding/decoding. The processed data may be output to the buffer 822, nonvolatile memory 823, the processor 824, the spindle/FM driver module 825, the analog front-end module 826, the write strategy module 827, the DSP module 828, and/or the I/O interface 829.

The DVD control module 821 may use the buffer 822 and/or nonvolatile memory 823 to store data related to the control and operation of the DVD drive 818. The buffer 822 may include DRAM, SDRAM, etc. Nonvolatile memory 823 may include any suitable type of semiconductor or solid-state memory, such as flash memory (including NAND and NOR flash memory), phase change memory, magnetic RAM, and multi-state memory, in which each memory cell has more than two states. The DVD PCB 819 includes a power supply 830 that provides power to the components of the DVD drive 818.

The DVDA 820 may include a preamplifier device 831, a laser driver 832, and an optical device 833, which may be an optical read/write (ORW) device or an optical read-only (OR) device. A spindle motor 834 rotates an optical storage medium 835, and a feed motor 836 actuates the optical device 833 relative to the optical storage medium 835.

When reading data from the optical storage medium 835, the laser driver provides a read power to the optical device 833. The optical device 833 detects data from the optical storage medium 835, and transmits the data to the preamplifier device 831. The analog front-end module 826 receives data from the preamplifier device 831 and performs such functions as filtering and A/D conversion. To write to the optical storage medium 835, the write strategy module 827 transmits power level and timing data to the laser driver 832. The laser driver 832 controls the optical device 833 to write data to the optical storage medium 835.

Figure 11D:
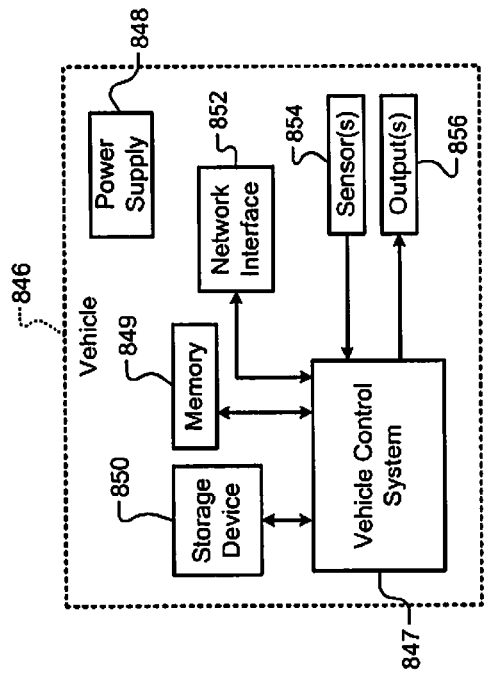
FIG. 11D is a functional block diagram of a vehicle.
Figure 11C:
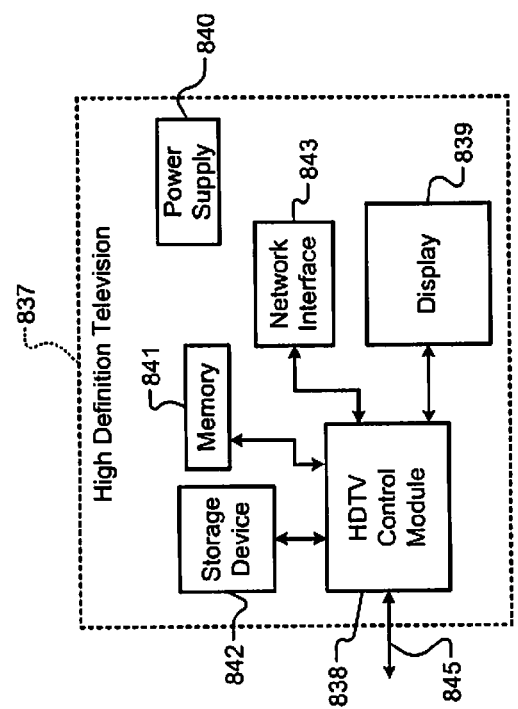
FIG. 11C is a functional block diagram of a high definition television.

Referring now to FIG. 11C, the teachings of the disclosure can be implemented in a network interface 843 of a high definition television (HDTV) 837. The HDTV 837 includes an HDTV control module 838, a display 839, a power supply 840, memory 841, a storage device 842, the network interface 843, and an external interface 845. If the network interface 843 includes a wireless local area network interface, an antenna (not shown) may be included.

The HDTV 837 can receive input signals from the network interface 843 and/or the external interface 845, which can send and receive data via cable, broadband Internet, and/or satellite. The HDTV control module 838 may process the input signals, including encoding, decoding, filtering, and/or formatting, and generate output signals. The output signals may be communicated to one or more of the display 839, memory 841, the storage device 842, the network interface 843, and the external interface 845.

Memory 841 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 842 may include an optical storage drive, such as a DVD drive, and/or a hard disk drive (HDD). The HDTV control module 838 communicates externally via the network interface 843 and/or the external interface 845. The power supply 840 provides power to the components of the HDTV 837.

Referring now to FIG. 11D, the teachings of the disclosure may be implemented in a network interface 852 of a vehicle 846. The vehicle 846 may include a vehicle control system 847, a power supply 848, memory 849, a storage device 850, and the network interface 852. If the network interface 852 includes a wireless local area network interface, an antenna (not shown) may be included. The vehicle control system 847 may be a powertrain control system, a body control system, an entertainment control system, an anti-lock braking system (ABS), a navigation system, a telematics system, a lane departure system, an adaptive cruise control system, etc.

The vehicle control system 847 may communicate with one or more sensors 854 and generate one or more output signals 856. The sensors 854 may include temperature sensors, acceleration sensors, pressure sensors, rotational sensors, airflow sensors, etc. The output signals 856 may control engine operating parameters, transmission operating parameters, suspension parameters, braking parameters, etc.

The power supply 848 provides power to the components of the vehicle 846. The vehicle control system 847 may store data in memory 849 and/or the storage device 850. Memory 849 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 850 may include an optical storage drive, such as a DVD drive, and/or a hard disk drive (HDD). The vehicle control system 847 may communicate externally using the network interface 852.

Figure 11F:
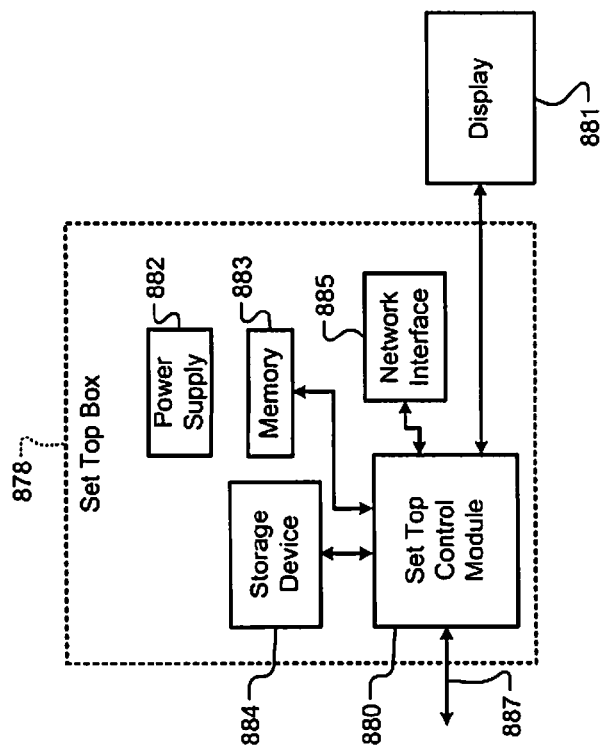
FIG. 11F is a functional block diagram of a set top box.
Figure 11E:
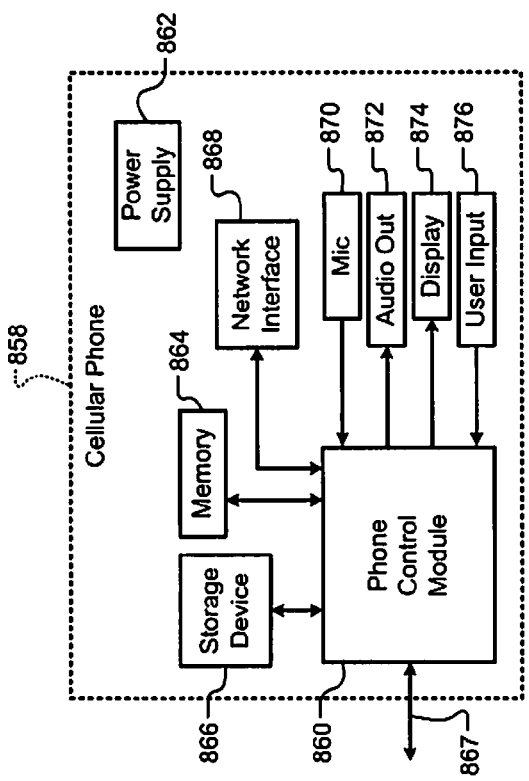
FIG. 11E is a functional block diagram of a cellular phone.

Referring now to FIG. 11E, the teachings of the disclosure can be implemented in a cellular network interface 867 and/or a network interface 868 of a cellular phone 858. The cellular phone 858 includes a phone control module 860, a power supply 862, memory 864, a storage device 866, and the cellular network interface 867. The cellular phone 858 may include the network interface 868, a microphone 870, an audio output 872 such as a speaker and/or output jack, a display 874, and a user input device 876 such as a keypad and/or pointing device. If the network interface 868 includes a wireless local area network interface, an antenna (not shown) may be included.

The phone control module 860 may receive input signals from the cellular network interface 867, the network interface 868, the microphone 870, and/or the user input device 876. The phone control module 860 may process signals, including encoding, decoding, filtering, and/or formatting, and generate output signals. The output signals may be communicated to one or more of memory 864, the storage device 866, the cellular network interface 867, the network interface 868, and the audio output 872.

Memory 864 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 866 may include an optical storage drive, such as a DVD drive, and/or a hard disk drive (HDD). The power supply 862 provides power to the components of the cellular phone 858.

Referring now to FIG. 11F, the teachings of the disclosure can be implemented in a network interface 885 of a set top box 878. The set top box 878 includes a set top control module 880, a display 881, a power supply 882, memory 883, a storage device 884, and the network interface 885. If the network interface 885 includes a wireless local area network interface, an antenna (not shown) may be included.

The set top control module 880 may receive input signals from the network interface 885 and an external interface 887, which can send and receive data via cable, broadband Internet, and/or satellite. The set top control module 880 may process signals, including encoding, decoding, filtering, and/or formatting, and generate output signals. The output signals may include audio and/or video signals in standard and/or high definition formats. The output signals may be communicated to the network interface 885 and/or to the display 881. The display 881 may include a television, a projector, and/or a monitor.

The power supply 882 provides power to the components of the set top box 878. Memory 883 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 884 may include an optical storage drive, such as a DVD drive, and/or a hard disk drive (HDD).

Figure 11G:
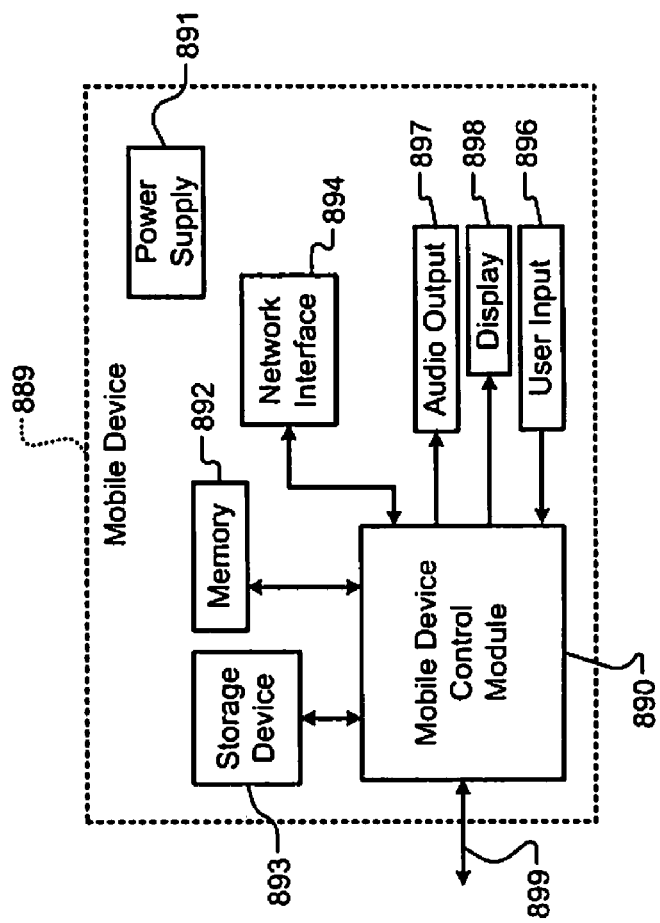
FIG. 11G is a functional block diagram of a mobile device.

Referring now to FIG. 11G, the teachings of the disclosure can be implemented in a network interface 894 of a mobile device 889. The mobile device 889 may include a mobile device control module 890, a power supply 891, memory 892, a storage device 893, the network interface 894, and an external interface 899. If the network interface 894 includes a wireless local area network interface, an antenna (not shown) may be included.

The mobile device control module 890 may receive input signals from the network interface 894 and/or the external interface 899. The external interface 899 may include USB, infrared, and/or Ethernet. The input signals may include compressed audio and/or video, and may be compliant with the MP3 format. Additionally, the mobile device control module 890 may receive input from a user input 896 such as a keypad, touchpad, or individual buttons. The mobile device control module 890 may process input signals, including encoding, decoding, filtering, and/or formatting, and generate output signals.

The mobile device control module 890 may output audio signals to an audio output 897 and video signals to a display 898. The audio output 897 may include a speaker and/or an output jack. The display 898 may present a graphical user interface, which may include menus, icons, etc. The power supply 891 provides power to the components of the mobile device 889. Memory 892 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 893 may include an optical storage drive, such as a DVD drive, and/or a hard disk drive (HDD). The mobile device may include a personal digital assistant, a media player, a laptop computer, a gaming console, or other mobile computing device.

The broad teachings of the disclosure can be implemented in a variety of forms. For example, one or more techniques discussed above may be applicable to other types of wireless networks (e.g. 3GPP LTE and WiMAX wireless networks). Therefore, while this disclosure includes particular examples, the true scope of the disclosure should not be so limited since other modifications will become apparent to the skilled practitioner upon a study of the drawings, the specification, and the following claims.

What is claimed is:

1. A networking system, comprising:
a first wireless network module configured to transmit a request to attach to a network; and
a second wireless network module configured to:
receive the request;
determine whether the first wireless network module requires an IP address based on the request; and
selectively allocate the IP address to the first wireless network module based on the determination,
wherein
the request includes an indication of whether the first wireless network module requires the IP address;
if the request indicates that the first wireless network module requires the IP address, the second wireless network module allocates the IP address to the first wireless network module based on the request; and
if the request indicates that the first wireless network module does not require the IP address,
the second wireless network module does not allocate the IP address to the first wireless network module;
the first wireless network module attaches to the network without receiving the IP address;
after attaching to the network, the first wireless network module obtains the IP address from a third wireless network module; and
the first wireless network module modifies a bearer context based on the IP address obtained from the third wireless network module.

2. The networking system of claim 1, wherein the second wireless network module is configured to retrieve subscriber data associated with the first wireless network module based on the request.

3. The networking system of claim 2, further comprising a database configured to store the subscriber data.

4. The networking system of claim 2, wherein the second wireless network module is configured to determine whether to allocate the IP address to the first wireless network module based on the subscriber data.

5. The networking system of claim 4, wherein the subscriber data indicates whether the first wireless network module is one of an integrated wireless terminal and a non-integrated wireless terminal.

6. The networking system of claim 4, wherein the subscriber data indicates whether the first wireless network module requires IP address allocation during an attach procedure.

7. The networking system of claim 1, wherein the network comprises a $3^{rd}$ Generation Partnership Project (3GPP) evolved wireless network.

8. The networking system of claim 1, wherein the first wireless network module comprises at least one of a mobile telephone and a laptop computer.

9. The networking system of claim 1, wherein the second wireless network module comprises at least one of a mobility management entity (MME), a gateway, and a home subscriber server (HSS) in a $3^{rd}$ Generation Partnership Project (3GPP) evolved wireless network.

10. The networking system of claim 1, wherein the second wireless network module is configured to create a bearer context request that indicates whether the first wireless network module requires IP address allocation.

11. A networking method, comprising:
transmitting a request to attach to a network from a first wireless network module;
receiving the request at a second wireless network module;
determining whether the first wireless network module requires an IP address based on the request;
selectively allocating an IP address to the first wireless network module based on the determination, wherein the request includes an indication of whether the wireless network module requires the IP address;
if the request indicates that the wireless network module requires the IP address, allocating the IP address to the first wireless network module based on the request;
if the request includes an indication that the wireless network module does not require the IP address,
not allocating the IP address to the first wireless network module, wherein
the first wireless network module attaches to the network without receiving the IP address; and
after attaching to the network, the first wireless network module obtains the IP address from a third wireless network module; and
modifying a bearer context based on the IP address obtained from the third wireless network module.

12. The method of claim 11, further comprising retrieving subscriber data associated with the first wireless network module based on the request.

13. The method of claim 12, further comprising storing the subscriber data in a database.

14. The method of claim 12, further comprising determining whether to allocate the IP address to the first wireless network module based on the subscriber data.

15. The method of claim 14, wherein the subscriber data indicates whether the first wireless network module is one of an integrated wireless terminal and a non-integrated wireless terminal.

16. The method of claim 14, wherein the subscriber data indicates whether the first wireless network module requires IP address allocation during an attach procedure.

17. The method of claim 11, wherein the network comprises a $3^{rd}$ Generation Partnership Project (3GPP) evolved wireless network.

18. The method of claim 11, wherein the first wireless network module comprises at least one of a mobile telephone and a laptop computer.

19. The method of claim 11, wherein the second wireless network module comprises at least one of a mobility management entity (MME), a gateway, and a home subscriber server (HSS) in a $3^{rd}$ Generation Partnership Project (3GPP) evolved wireless network.

20. The method of claim 11, further comprising creating a bearer context request that indicates whether the first wireless network module requires IP address allocation.

* * * * *